United States Patent [19]
Lanier et al.

[11] 3,869,294
[45] Mar. 4, 1975

[54] PHOSPHONITRILE POLYMER

[75] Inventors: Carroll W. Lanier, Zachary; James T. F. Kao, Baton Rouge, both of La.

[73] Assignee: Ethyl Corporation, Richmond, Va.

[22] Filed: Mar. 5, 1973

[21] Appl. No.: 337,825

[52] U.S. Cl.............. 106/15 FP, 252/8.1, 260/926, 260/927 N
[51] Int. Cl............................................. C09d 5/18
[58] Field of Search..... 106/15 FP; 260/926, 927 N; 252/8.1

[56] References Cited
UNITED STATES PATENTS

| | | | |
|---|---|---|---|
| 2,909,446 | 10/1959 | Redfarn et al. | 106/15 FP |
| 3,206,494 | 9/1965 | Lund et al. | 260/926 |
| 3,455,713 | 7/1969 | Godfrey | 252/8.1 |
| 3,505,087 | 4/1970 | Godfrey | 252/8.1 |

*Primary Examiner*—Harry Wong, Jr.
*Attorney, Agent, or Firm*—Donald L. Johnson; John F. Sieberth; James M. Pelton

[57] ABSTRACT

Phosphonitrilate polymers suitable for fire retardant use are prepared by reacting a phosphonitrilic halide such as $(PNCl_2)_n$ with an organophosphazene $[PN(OR)_2]_n$ such that an alkyl halide is removed, thereby forming a P—O—P bond, and reacting the resultant polymer with an aqueous alkali or alkaline earth metal hydroxide.

9 Claims, No Drawings

PHOSPHONITRILE POLYMER

BACKGROUND OF THE INVENTION

Various materials made from phosphonitrilic halides have been found useful for fire retardants; U.S. Pat. Nos. 3,455,713, 3,505,087, 3,532,526. So far as is known, materials afforded by this invention have heretofore not been described. The fire retardants of this invention have increased viscosity. Such increase can assist incorporation into cellulose fibers and textiles. Poly(dichlorophosphazene) linked by a P—O—P bond is depicted on page 138 of H. R. Allcock, *Phosphorus-Nitrogen Compounds*, Academic Press, New York, N.Y. (1972), and page 317 of J. R. Van Wazer, *Phosphorus and its Compounds*, Vol. I, Interscience Publishers Inc., New York, N.Y. (1958).

Polymers containing P—O—P bonds, and ethoxide and phenoxide groups, but made by a process different from that afforded by this invention, are disclosed on pages 97-8 of *Chemical Week*, Feb. 20, 1965.

SUMMARY OF THIS INVENTION

This invention encompasses four major aspects: phosphonitrilate polymers, their preparation, their incorporation in regenerated cellulose, and the flame retardant cellulose produced thereby.

Thus, one embodiment of this invention is a process for producing a fire retardant polymer comprising the steps of (a) heating an organophosphazene with a phosphonitrilic halide to drive off an organic halide, and (b) reacting the resultant polymer with an aqueous alkali or alkaline earth metal hydroxide.

Another embodiment comprises the phosphonitrilate polymers produced according to the above process.

A further embodiment comprises a method of producing a flame retardant regenerated cellulose filament which comprises mixing viscose and a flame retardant phosphonitrilate polymer prepared by a process which comprises (a) heating an organophosphazene with a phosphonitrilic halide to drive off an organic halide, and (b) reacting the resultant polymer with an aqueous alkali metal or alkaline earth metal hydroxide, shaping the mixture into a filament, and coagulating and regenerating said filament.

Still another embodiment comprises regenerated cellulose filaments and filamentary articles having dispersed therein a flame retardant amount of a phosphonitrilate polymer produced by a process comprising the steps of (a) heating an organophosphazene with a phosphonitrilic halide to drive off an organic halide, and (b) reacting the resultant polymer with an aqueous alkali or alkaline earth metal hydroxide.

DESCRIPTION OF PREFERRED EMBODIMENTS

Starting materials for production of flame retardants of this invention are phosphonitrilate polymers. These can be cyclic trimer, tetramer or higher cyclic polymer, or a linear polymer. For economic reasons, a mixture of these materials is preferred. The phosphonitrilate halide may contain an appreciable quantity, say at least 15 weight percent, of cyclics, but those containing less than 15 percent cyclics can be used. Thus, mixtures of linears and cyclics, or all cyclic or all linear material can be used. The phosphonitrilic halides have the formula $$(PNX_2)_n$$

wherein X is halogen, and $n$ is an integer of at least 3. Of the halogens, chlorine and bromine are preferred. Thus, preferred starting materials of this invention are phosphonitrilic bromides and chlorides. Phosphonitrilic chlorides are preferred for economic reasons.

These materials can be prepared by reaction of ammonia or ammonium chloride with phosphorus pentachloride:

$$nPCl_5 + nNH_4Cl \rightarrow (PNCl_2)_n + 4nHCl$$
$$nPCl_5 + nNH_3 \rightarrow (PNCl_2)_n + 3nHCl$$

Methods for conducting these processes have been described in U.S. Pat. Nos. 3,367,750 and 3,656,916, for example. Those patents are incorporated by reference herein as if fully set forth.

Phosphonitrilic chlorides can also be obtained by reacting ammonia with phosphorus and chlorine; U.S. Pat. No. 3,658,487. Such products can also be obtained by reacting phosphorus trichloride, chlorine and ammonium chloride; U.S. Pat. Nos. 3,359,080. 3,658,487 and 3,359,080, supra, are incorporated by reference herein as if fully set forth.

Additional methods for preparing phosphonitrilic chlorides are exemplified by *Am. Chem. J.* 19 782 (1897), Schenk et al, *Ber.* 57B 1343 (1924), U.S. Pat. Nos. 2,788,286, 3,008,799, 3,249,397, 3,347,643, 3,372,005, 3,378,353, 3,379,511, 3,407,047, 3,462,247, Netherlands 70/05128, and *J. Chem. Soc.* (A), pages 768–772 (1971). The methods of those references are incorporated by reference herein as if fully set forth.

A preferred method for preparing phosphonitrilic halides for use in this invention may be described as follows. The phosphorus pentachloride slurried in monochlorobenzene is charged to a reactor. The reactor is sealed and hydrogen chloride gas is introduced into the reactor with agitation so that the hydrogen chloride is more readily dissolved in the solvent. The reactor pressure is held at from about 10 to about 40 psig of hydrogen chloride. The ammonia is then introduced at a rate of not less than about 0.13 liters per minute per mole of $PCl_5$, and the heat is applied to raise the temperature of the reaction mixture to 110°C. to 150°C. during this initial ammonia feed. The hydrogen chloride pressure will fall at first, and additional hydrogen chloride can be added to maintain the desired pressure. However, this is not essential if the initial pressure is at least 10 psig at the start of ammonia feed since by-product hydrogen chloride will be produced before all of the pre-added hydrogen chloride is used up. The reaction between ammonium chloride and $PCl_5$ initiates at about 60°C. The temperature rises to about 110°–140°C. The feed rate of ammonia is reduced after about one-half hour and held to a rate of of from about 0.05 to about 0.13 liters per minute per mole of $PCl_5$. This rate is continued for about 3 hours, or depending upon the amount fed until at least the stoichiometric amount of ammonia is added. After the ammonia has been fed into the reaction, the temperature is maintained for about 1 hour at between 110°–150°C., preferably from 120°C. to 130°C., under pressure from 10–40 psig and preferably about 20 psig. This heating period finishes the reaction by allowing traces of unreacted material to react. After about 1 hour, the pressure is released and heating is continued for another one-half hour at reaction temperature. This allows any remaining hydrogen chloride dissolved in the solvent to be removed.

The product of this reaction is generally 65–75 percent cyclic phosphonitrile chloride polymers and 35–25 percent linear materials. In general, the cyclic distribution ranges from 60–75 percent trimer, 18–24 percent tetramer, and 7–12 percent of pentamer. The product yield ranges upward of 90 percent, based on the amount of phosphorus used. Yields higher than 92 percent are not uncommon. In contrast, products of prior art processes have cyclic products ranging from 80–85 percent cyclic using lower feed rates followed by higher feed rates of ammonia. Moreover, the traditional process for producing phosphonitrile chloride using a solid ammonium chloride of commercial grade and a halogenated aliphatic hydrocarbon solvent produces a generally higher molecular weight product consisting of about 50 percent cyclics and about 50 percent linears.

EXAMPLE I

To a glass reactor equipped with stirrer, a reflux condenser and a means for heating the reactor contents was charged 208.3 grams (1.0 mole) of phosphorus pentachloride in 312.5 grams of monochlorobenzene. The reactor was sealed and anhydrous hydrogen chloride was fed into the reactor with stirring until the pressure of the reactor was about 15 psig. A total of 7.6 grams (0.208 mole) of hydrogen chloride was added to the reactor. Gaseous ammonia was then introduced to the reactor at a rate of 0.182 liters per minute per mole of phosphorus pentachloride while the reactor contents were heated at a rate of 2.5°C. per minute using a heating mantle on the reactor. The ammonia fed rate was dropped to 0.0908 liters per minute per mole of phosphorus pentachloride after about 5.46 liters (0.241 mole) of ammonia was fed into the reactor over a period of about 30 minutes. The temperature was controlled at 130°C. and pressure at 20.0 psig. The ammonia feed was stopped when a total of 22 liters (1.0 mole) was fed into the reactor. The heating and stirring was continued for one hour at 20 psig, and for another 30 minutes at atmospheric pressure. The total reaction time was 5½ hours. The reactor contents were then cooled to room temperature and discharged from the reactor by nitrogen pressure. About 400 grams of clear product solution was obtained. Analysis by vapor phase chromatograph showed that the solution contained 26.6 percent phosphonitrilic chlorides of which 63.3 percent were cyclic compounds with the following distribution: trimer — 73 percent, tetramer — 20 percent, and pentamer — 7 percent. The recovered yield was 92 percent, based on phosphorus pentachloride.

EXAMPLE II

The procedure of Example I was repeated, except that a total of 22.8 liters (1.047 mole) of ammonia was fed to the reactor and the initial heating rate was 1.5°C. per minute. The reaction was initiated at 65°C. as observed by a sudden change in the rate of temperature increase. The reaction mixture was heated to 130°C. over 2 hours period and held at that temperature for 3 hours. The product slurry, about 392.5 grams, was obtained after 5 ½ hours reaction time. Vapor phase chromatograph analysis of the product showed 67.7 percent cyclic phosphonitrilic chloride polymers having the following distribution: trimer — 64 percent, tetramer — 24 percent, pentamer — 12 percent. The recovered yield of total product was 92 percent, based on phosphorus pentachloride.

The procedure of Example I was repeated with different reaction times and temperatures. Ammonia was fed at the same rate with 10 percent excess (1.1 mole total) (Examples III and IV) to 2 percent short (0.98 mole total) (Example V). The results of these experiments are shown in the following table:

TABLE 1

PREPARATION OF PHOSPHONITRILIC CHLORIDE

| Ex. | Reaction Temp. °C | Reaction Time hrs | Percent Product Distribution | | | % Cyclics | % Yield |
|-----|-------------------|-------------------|--------|----------|----------|-----------|---------|
|     |                   |                   | Trimer | Tetramer | Pentamer |           |         |
| III | 120               | 7½                | 65     | 20       | 15       | 75        | 85      |
| IV  | 140               | 4½                | 73     | 18       | 8        | 77        | 74      |
| V   | 150               | 4                 | 90     | 8        | 2        | 50        | 80      |

Aside from serving as one reactant in the preparatory process of this invention, the phosphonitrilic halides also serve as starting materials for the other reactant in the process. Such other reactants are organophosphazenes having the formula

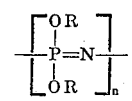

where R is an organic group. These materials are derivatives of alcohols and phenols, and similar products can be made from the mercaptan and thiophenol analogs. These materials can be reacted with the phosphonitrilic halide starting material, preferably in the presence of pyridine or other base; U.S. Pat. Nos. 2,586,312, 2,192,921, J. Am. Chem. Soc. 71, 2251 (1949), and Netherlands Pat. No. 71/06,722. More preferably, the alcohols and phenols are reacted in the form of metal alcoholates and phenolates

         I.

wherein R is an organic radical, preferably of one to 8 carbon atoms and M is an alkali metal, preferably sodium or potassium.

With regard to these reactants, it is to be understood that there is nothing critical about the nature of the metal. Sodium and potassium are preferred because of their ready availability and reactivity. However, other metals can be used such as magnesium and calcium.

Examples of alkyl groups represented by R in the above formula (I) are methyl, ethyl, n-propyl, isopropyl, n-butyl, isobutyl, sec-butyl, tert-butyl, n-amyl, and the various positional isomers thereof, and likewise the corresponding straight and branched chain isomers of hexyl, heptyl, octyl, nonyl, and the like.

When R is cycloalkyl, it may be cyclopropyl, cyclobutyl, cyclopentyl, cyclohexyl, cycloheptyl, cyclooctyl, cyclononyl, and the like. It may also be such cycloaliphatic groups as α-cyclopropyl-ethyl, α-cyclobutylpropyl, and similar alkyl derivatives of the higher cycloalkyls.

The R in the above formula may also be alkenyl such as ethenyl, 1-propenyl, 2-propenyl, isopropenyl, 1-butenyl, 3-butenyl, and the corresponding branched-chain isomers thereof as, for example, 1-isobutenyl, 2-isobutenyl, 2-sec-butenyl, including 1-methylene-2-propenyl, and the various isomers of pentenyl, hexenyl, heptenyl, octenyl, noneyl, and the like.

When R is alkaryl, it may be 2,3-xylyl, 2,4-xylyl, 2,5-xylyl, 2,6-xylyl, 3,4-xylyl, 3,5-xylyl; o, m, and p-cumenyl, mesityl, o, m, and p-ethylphenyl, and the like.

Examples of aryl groups which may be present in the above formula are phenyl, naphthyl, and the like.

When R is aralkyl, it may be benzyl, phenylethyl, 1-phenylpropyl, 2-phenylpropyl, 3-phenylpropyl, 1 and 2 isomers of phenylisopropyl, and the like.

It is not necessary to use pure alcohol, phenol, alkoxide, phenoxide or sulfur analog of these substances. One may use a mixture, for example, sodium methoxide - sodium propoxide and sodium methoxide - sodium phenolate. Ternary mixtures and mixtures with 4 or more components can be used. The relative concentration of reactants in these mixtures can be varied as desired.

The reaction between phosphonitrilic halide and hydroxy compound, or metal derivative thereof, is preferably conducted in the liquid state to facilitate contacting the reactants. Preferred reaction media are hydrocarbons such as hexane, heptane, octane, ligroin, benzene, toluene, the xylenes, and the like, and alcohols such as propanol.

In addition, R in the above formula may have one or more halogens attached. Thus, for example, R can be the fluorinated, chlorinated, or brominated allyl derivatives such as 2,3-dichloropropyl, 1,3-dichloropropyl, 2,3-dibromopropyl and the like.

Likewise, it is to be understood that derivatives of RSH compounds, wherein R is as described above, are also an embodiment of this invention.

As indicated above, the phosphazenes are preferably prepared by reacting phosphonitrilic halide with alkali metal derivative be in substantial excess over the theoretical requirement. By a substantial excess is meant an excess of at least about 5 weight percent. It is convenient to use amounts of alkoxide or aryloxide which are from about 5 to about 15 weight percent excess over the theoretical requirement.

In many instances, the reaction is rapid and exothermic at the beginning and requires no heating. After mixture of the reactant is complete it may be convenient to heat the resultant reaction mass and hold it at reflux temperature for such time as analysis indicates complete reaction. Reaction times in the range of from ½ to 10 hours can be used. This is somewhat dependent upon the reaction temperature which is usually within the range of from ambient to 130°C; more preferably from about 55° to about 110°C.

After conduction of the reaction, the excess free hydroxy compound and the solvent are removed by distillation or other suitable means. These can be recycled for later use.

As with the preparation of the metal derivative of the hydroxy compound, the phosphazene synthesis proceeds well at ambient pressure. Accordingly, atmospheric pressure is of choice. However, greater or lesser pressures can be used if desired.

When preparing mixed phosphazenes, the phosphonitrilic halide is reacted with a mixture of metal derivatives of two or more hydroxy compounds. Thus, for example, one can prepare mixed propoxyphosphazenes by reacting the sodium derivative of a mixture of normal- and isopropyl alcohols. In a similar fashion, mixed ethoxy-butoxy phosphazenes and mixed butoxyphosphazenes can also be prepared. In like manner, the phosphazenes may be derived from two or more phenols or can be prepared from mixtures of phenols and alcohols. A typical example of the latter type is the product obtained by reacting phosphonitrilic chloride with a 1:1 mixture of sodium methoxide and sodium phenoxide.

It is to be understood that mercaptides can be used in a fashion similar to that described above to prepare the sulfur compounds analogous to the above-described phosphazenes.

After removal of the free hydroxy compound and solvent, it is convenient to isolate the product from the resultant mass by water-washing followed by stripping the remainder of the solvent. In many instances, best results are obtained by using a plurality of water washes. In many instances, two washes will suffice. For precaution against emulsions during washing, it is preferred to have the water washes conducted such that the water has a pH of 9 or higher. Water-washing is employed by mixing the phosphazene product with water and agitating. Typical agitating times are 10 to 20 minutes but shorter or longer times can be employed, if desired. If in the first water wash, a rag layer appears, it can be left with the organic layer for a subsequent wash. If emulsion appears in the second wash, sodium chloride or other salt can be added to increase the density difference between the phases.

After water-washing and separating, the organic layer can be subjected to distillation to remove solvent. Distillation can be conveniently conducted at reduced pressure, say, 20–30 mm Hg. All or substantially all solvent can be removed in this manner; alternatively, the bulk of residual solvent can be removed by other means such as a Rodney Hunt wiped film evaporator.

The following typical procedure is illustrative but non-limiting.

EXAMPLE VI

A. Take a 4000 gallon, glass-lined reactor equipped with heating, cooling, stirring, and condensing means as well as a vent routed through a water scrubber to remove by-product HCl. Clean and dry the vessel and purge it with nitrogen. Charge 17,150 pounds of monochlorobenzene and activate the stirring means. Add 10,268 pounds of $PCl_3$ and activate cooling means.

Feed chlorine into the vapor phase in the reactor such that a total of 5,210 pounds is admitted. Keep the addition rate such that the reactor temperature is at a 25°C. maximum and the reactor pressure is below 5 psig. The addition of chlorine will take about 4-6 hours. The $PCl_5$ produced is utilized in the following way.

B. Break the vacuum with nitrogen and add 5210 pounds of $NH_4Cl$ below 80 microns in size. Seal the reactor and heat to reflux (~130°C.) for 8 hours. Vent the HCl gas evolved to the water scrubber.

Thereafter (the reaction is more than about 50 percent complete) slowly distill monochlorobenzene until 10,500 pounds have been removed. The reactor is maintained at 125°–135°C. until reaction is complete as determined by virtual cessation of HCl evolution and by demonstrating the equal volumes of reaction mass andd cyclohexane (or undecane) yield only one liquid phase.

Procedures (A and B) are repeated and the two bstches are combined. Centrifugation is conducted (using a centrifuge capable of 800 G operation) to remove excess $NH_4Cl$. The $NH_4Cl$ can be recycled.

The filtrate is stripped to remove 13,400 pounds of monochlorobenzene which is held for recycle. Then, 15,355 pounds of toluene are added to the product. The yield is 16,200 pounds of neat phosphonitrilic chloride from each two-batch lot.

C. Melt 495 pounds of sodium at 110°C. Heat 1,580 pounds of toluene to the same temperature. Add the molten sodium to the hot toluene in a suitable vessel. To the hot mixture add 1,480 pounds of propanol. By metering the $H_2$ evolution, add the propanol at such a rate that no more than about 150 pounds of unreacted propanol is present. Maintain the reaction mixture hot enough to avoid sodium solidification. Two to four hours is required for the propanol addition.

The reaction is maintained at reflux until hydrogen evolution has substantially ceased (and the sodium reacted to substantial completion). About 1–3 hours will be required after the completion of the propanol addition. The sodium propylate produced is utilized as below.

D. The toluene phosphonitrilic chloride mixture (2270 pounds) is added to the sodium propylate. The sodium propylate is a 10 percent excess over the theoretical requirement based on recovered $PNCl_2$. Initially, the reaction is rapid and exothermic and requires no heating. After all of the $PNCl_2$ has been added the mixture is heated to reflux (~107°C.) and held for 3–6 hours until the reaction is shown to be complete by VPC analysis.

Fifty gallons of propanol and toluene are removed from the reaction mixture by distillation. This is recycled back to the next batch of sodium propylate. The quantity of fresh propanol feed is adjusted for the composition of the recycle stream. The product is cooled to 60°C.

E. The first water wash consists of 375 gallons of water. The agitator is turned on for 15 minutes, then shut off and the mixture is allowed to settle for 30 minutes. The water layer is withdrawn. Any rag layer is left with the organic layer for the second wash. The second wash consists of 100 gallons of water. The contents are agitated for 15 minutes. The mixture is allowed to separate and the water layer is withdrawn. If an emulsion forms at this point, sodium chloride is added to increase the density different between the phases.

At this point, 2,715 pounds of solvent and a small quantity of n-propanol is stripped from the hexapropoxyphosphazene (HPP) at 20–30 mm Hg and <80°C. A forecut of 250 pounds is taken to remove residual water. The distillate is collected and the forecut is discarded. About 10 percent solvent remains in the HPP following this stripping operation. The product is fed to a Rodney-Hunt wiped-film evaporator where the remainder of the solvent is stripped from the HPP at 5–10 MM Hg, 100°C. (the final product contains <1.0 percent solvents). The HPP is stored in 350 gallon portable containers from which it is filtered and packaged for shipping. The solvent is transferred to the distillation columns where the MCB and toluene are separated for recycle.

EXAMPLE VII

A. To a clean, dry, nitrogen-flushed 10 gallon glass-line reaction vessel, charge 41.5 pounds of dry monochlorobenzene (MCB) and 25.68 pounds of $PCl_3$. Pressure the vessel to 10 psig with nitrogen, then evacuate to 200 mm and shut off the vacuum system from the vessel. Chlorine (13.4 pounds) (1 percent excess) gas is added above the surface of the stirred liquid. This reaction is exothermic and it is necessary to cool the reaction to hold the temperature below 25°C. However, do not cool below 5°C. as $PCl_3$ will crystallize out and the chlorination will not be complete. White solid $PCl_5$ separates from the MCB solution. Near the end of the reaction, permit a positive pressure of 10 pounds of chlorine on the reactor. When the theoretical weight of chlorine has been added, remove a sample of the liquid layer and analyze for $PCl_3$.

B. Add dry ammonium chloride (11.0 pounds or 10 percent excess) to the $PCl_5$ slurry in the 10 gallon glass-lined vessel. Seal the vessel, mix and introduce nitrogen over the surface of mixture to assist in HCl removal. Slowly heat to 125°C, removing all materials distilling up to 105°C with $N_2$ in the head space. The rate of heating is determined by the rate of HCl evolved. Attach the top of the condenser to a HCl scrubber and measure the HCl evolved by weighing the HCl scrubber. Reaction will start between 95°–115°C. depending on $NH_4Cl$ particle size. When about 10–15 percent of the HCl gas has been evolved, start the addition of ammonia gas to the reactor at such a rate as to maintain an excess of HCl gas being evolved from the reactor. Add a total of 3.5 pounds of $NH_3$ gas (10 percent excess). Use a capillary dipleg, maintain a $N_2$ stream through the dipleg until the $NH_3$ feed has begun. At the completion of the $NH_3$ feed, resume nitrogen feed — at all times have a gas stream through the dipleg. Sample during the last part of the HCl evolution for analysis. Test material for complete cyclization after HCl evolution is complete by mixing an equal volume of the $PNCl_2$ solution, as is, with an equal volume of cyclohexane. If one phase remains, then the reaction is ready for the next step.

Filter the mixture to remove the excess $NH_4Cl$, wash the filter with MCB, and then dry and use this $NH_4Cl$ in the next run. Strip off the MCB at 50°–55°C (20 mm Hg absolute) until a thick stirrable slurry remains. Add the minimum amount of toluene to the mixture to effect complete solution.

To prepare the fire retardants of this invention, one heats the phosphonitrilic halide and phosphazene and then reacts the resultant polymer with an aqueous alkali or alkaline earth metal hydroxide. During the heating, gas is evolved in most instances. This gas is organic halide derived from (a) the organic radical in MOR as discussed above, and (b) the halogen in the phosphonitrilic chloride. Although not bound by any theory, it is believed product produced by the reaction can be illustrated by the following formula depicting a portion of two chains being bridged by —P—O—P— bonds formed upon heating a phosphazene and phosphonitrilic halide and containing —P—O—Na and —P—O—H bonds formed upon reacting the resultant polymer with for example, aqueous sodium hydroxide:

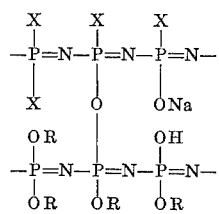

It is to be understood that the above formula is not limiting; similar structures could be formed between rings or between a ring and a chain. Likewise, the bridging oxygens and the —P—O—Na or —P—O—H bonds need not be on adjacent phosphorus atoms. Similarly, some of the groups represented by X could be available for further crosslinking with another, or the same, ring or chain.

The temperature of the phosphazene and phosphonitrilic halide condensation reaction is not critical. It is desired that the temperature be high enough to afford reaction but not so high as to cause undue decomposition of product or reactant. In general, mildly elevated temperatures are employed and the temperature is usually higher than that used to react alcohol, phenol, alcoholate, or phenolate with phosphonitrilic halide. Good results are achieved if the temperature is within the range of from about 120° to about 220°C; higher and lower temperatures can be used. A preferred temperature range is from about 120° to about 180°C.

The heating time is not critical. The time is at least somewhat dependent upon the inherent ability of the reactants to react. Also, the time is dependent on the degree of reaction desired. In general longer heating times, as higher heating temperatures, afford greater crosslinking. Hence, one may use a higher temperature and shorter heating period and achieve a degree of reaction or viscosity increase similar or the same as that achieved by using a lower temperature and longer heating time. Thus, with a minor amount of simple experimentation, a skilled practitioner can readily determine what time and temperature to be employed to achieve the desired amount of reaction or viscosity increase. In general, heating times of from about ½ to about 120 minutes afford good results. A preferred time range is from about 3 to about 60 minutes. However, times as long as three hours or more can be used.

The reaction can be conducted in the presence of an inert, liquid reaction medium such as toluene, heptane or other hydrocarbon, but it is unnecessary to do so. Likewise, it is unnecessary to conduct the step on a single, purified compound. For economic reasons, it is preferred to conduct the process on the product of the reaction step prepared from a mixture of phosphonitrilic halides and phosphazenes. If desired, the reaction can be conducted in the presence of an inert atmosphere, but it is unnecessary to do so. Nitrogen, neon, or other inert gas can be used.

The reaction can be conducted at ambient pressure. However, subatmospheric and superatmospheric pressure can be used, if desired, for the process pressure is not critical. If elevated pressures are selected, they should not be so high as to unduly impede the process by hampering evolution of by-product gas.

In conducting the process, an amount of phosphonitrilic halide is employed which is from about 1 to about 50 weight percent of the amount of phosphazene. Preferably the amount employed is from about 2 to about 20 weight percent, and more preferably from about 3 to about 15 weight percent.

The process can be conducted using pure trimeric phosphonitrilic halide and pure trimeric phosphazene, that is where $n$ equals 3 in both instances. However, better results are obtained in many instances when higher molecular weight starting materials are used. Thus, in general, phosphonitrilic halide mixtures having a number average molecular weight of from about 400 to about 10,000 are generally employed. More preferably, materials having a number average molecular weight within the range of 400–8,000 are used, and most preferably, those having a number average molecular weight within the range of 500–3,000 are employed. Accordingly, the value of $n$ at a number average molecular weight of 10,000 for phosphonitrilic chloride calculates to 86.2 and, thus, $n$ can be up to about 90. If phosphonitrilic bromides are used, one may employ materials of corresponding molecular weight, i.e. materials having the higher molecular weight than above conferred by the greater atomic weight of bromine.

The phosphazenes are prepared from the phosphonitrilic halides as described above. Hence, their molecular weights are commonly those of the ranges given above as modified by the substitution of alkoxy or aryloxy groups for the halogen atoms. Thus, for example, one may use propoxyphosphazene mixtures having a number average molecular weight of from about 500 to about 10,000 preferably 600–4,000, more preferably 600–1,000. Simple calculations show that when the higher number average molecular weight of 10,000 is employed, the value of $n$ is about 90, where R has one carbon atom, and about 35, where R has eight carbon atoms. Similarly, one can use propoxyphosphazenes having a number average molecular weight corresponding to the preferred and more preferred molecular weight ranges for the phosphonitrilic chlorides; the correspondence taking into consideration the difference in molecular weight between the propoxy and chloro groups. If different alkoxy or aryloxy groups are present in the molecule, a corresponding difference in molecular weight of the phosphazene starting material will be achieved.

It is to be understood that the phosphazene reactant may contain some residual halogen atoms. In general, these may be present because of incomplete substitution with the alkoxide or phenoxide groups. Thus, for example, the propoxyphosphazenes may contain up to 5 weight percent chlorine.

Preferred condensation products of this invention prepared from phosphonitrilic chlorides and propoxyphosphazenes have a number average molecular weight of from about 900 to about 15,000. More preferably, the molecular weight range is from about 900 to about 1,600. More preferred and most preferred products produced from other phosphazenes have molecular weights corresponding to these as modified by the different molecular weights of the different phenoxy or alkoxy radicals present therein.

EXAMPLE VIII

A hexapropoxyphosphazene having a viscosity of about 83 centipoises and a molecular weight of 600 was heated to 180° for 10 minutes. The sample lost 2.4 grams in weight and the viscosity increased to 181 centipoises. Continued heating at 180°C. for a total additional time of one and one-half hour raised the viscosity to 376.7 centipoises. At this time 2 grams of phosphonitrilic chloride were added to the reaction vessel, and the resultant mixture heated for 30 minutes causing an additional loss of 5.0 grams in weight. This heat treatment raised the viscosity to 5,295 centipoises.

The phosphonitrilic chloride used in this example was produced in general accordance with the procedures of Examples I–V herein. Typically, such phosphonitrilic chlorides have about 70 percent cyclic materials therein. Of these cyclics, approximately 70 percent are trimer, 21 percent tetramer, and 6 percent pentamer. They have the molecular weight corresponding to the 600 molecular weight of the hexapropoxyphosphazene as necessary modified by inclusion of the chloro atoms rather than the propoxy radicals.

EXAMPLE IX

A 100 gram portion of a phosphonitrilic chloride similar to that employed in Example VIII was added to a 500 ml reaction vessel. To this sample was added 160 ml of petroleum ether having a boiling point of approximately 30°–60°C. The resultant mixture was magnetically stirred vigorously for about 10 minutes. The resultant, clear supernatant was decanted and vacuum stripped at approximately 45°C. and 1 mm mercury pressure. Prior to the stripping, the insolubles were re-extracted with 90 ml of fresh petroleum ether and the 2 supernatants combined. The petroleum ether soluble fraction amounted to 50.78 grams and was much more cyclic in content than the ether insoluble fraction which amounted to 43.62 grams.

EXAMPLE X

A hexapropoxyphosphazene product was produced by reacting ammonium chloride with $PCl_5$ in monochlorobenzene and subsequently reacting the phosphonitrilic chloride thereby produced with sodium propoxide. The procedure was in general accordance with that set forth in Example IV herein. This material had the following characteristics:

| | |
|---|---|
| P weight percent | 18.9 |
| N weight percent | 8.62 |
| C weight percent | 42.9 |
| H weight percent | 8.55 |
| Cl weight percent | 1.0 |
| molecular weight (in benzene) | 788 |
| viscosity 20°C. in centistokes | 3.48 |
| trimer percent | 28.4 |
| tetramer percent | 10.2 |
| pentamer percent | 1.9 |

A 186 gram portion of this material was added to a 500 ml three-neck flask equipped with a nitrogen source, thermometer, and outlet to a vacuum source. Then 14.0 grams of the petroleum soluble fraction of the phosphonitrilic chloride produced in Example VIII was added to the flask, and the mixture stirred magnetically for about 1 hour.

Thereafter, full pump vacuum was applied, and the mixture warmed to 126°C. over a period of 40 minutes. The mixture was then gradually heated to 180°C. over a 43-minute period. Thereafter, the temperature was reduced to 110°C. over a 12-minute period, and then, the heat source removed from the reaction vessel.

Approximately 19 ml of propyl chloride was removed during this heating procedure, and the final weight of the reaction product was 499.45 grams. This material had a viscosity in centistokes at 68°F. of 5,971, a number average molecular weight of 1,140, a weight percent phosphorus of 21.1, and a weight percent chlorine of 1.03.

EXAMPLE XI

Following the procedure of Example X in utilizing the same size reaction vessel, 186 grams of the same propoxyphosphazene were reacted with a 14-gram sample of the petroleum ether insoluble fraction isolated in Example IX.

The product was made in a similar fashion by heating to 123°C. over a period of about 37 minutes, and then maintaining the resultant material at 123°–165°C. for 2 hours and 11 minutes.

Again, about 19.5 grams of propyl chloride was removed while the above heating was conducted at 65–80 mm of mercury pressure.

This material had a viscosity at 68°F. of 5,927 centistokes, a number average molecular weight of 1110, a weight percent phosphorus of 20.9, and a weight percent chlorine of 1.06.

Similar results are obtained using phosphonitrilic chloride made by the processes of Examples I–IV and propoxyphosphazene made therefrom. Similar results are obtained using phosphonitrilic chlorides and propoxyphosphazenes made according to procedures of Examples VI and VII.

Similar results are obtained when the weight percent of phosphonitrilic chloride in the mixture of phosphonitrilic chloride and phosphazene is from 5 to 15 weight percent.

Similar results are obtained when the phosphonitrilic chloride and propoxyphosphazene have molecular weights of from when $n = 3$ to 4,000.

Similar results are obtained when the reaction temperature is from 120°–220°C and phosphonitrilic chloride is reacted with organophosphazenes made by reacting phosphonitrilic chloride with sodium ethoxide
sodium n-butoxide
sodium ethoxide - sodium n-butoxide
  50-50 mixture by weight
sodium phenoxide
sodium heptoxide

EXAMPLE XII

Utilizing a propoxyphosphazene product having a viscosity of about 83 centipoises and a number average molecular weight of 600–650, together with a phosphonitrilic chloride of about 70.2 percent cyclics of which about 72 percent were trimer, 21 percent tetramer and 6.5 percent pentamer. Various condensation products were made as set forth in the following table:

TABLE II

| Run No. | 1 | 2 | 3 | 4 | 5 | 6 | 7 | 8 |
|---|---|---|---|---|---|---|---|---|
| $PNCl_2$, Wt. % | 12.3 | 12.3 | 5.0 | 13.4 | 11.9 | 12.3 | 12.3 | 12.3 |
| as Cl. Wt % | 7.5 | 7.5 | 3.1 | 8.2 | 7.3 | 7.5 | 7.5 | 7.5 |
| Temp., °C | | | | | | | | |
| 1st liquid drop | 120 | 129 | 136 | 125 | 127 | 129 | 129 | 136 |
| Max. T | 145 | 145 | 145 | 141 | 137 | 140 | 146 | 145 |
| Time, min. | | | | | | | | |
| Warming up | 12 | 20 | 31 | 22 | 15 | 31 | 19 | 25 |
| Reaction | 39 | 65 | 85 | 85 | 120 | 99 | 36 | 55 |
| Stripping | 10 | 20 | 20 | 20 | 60 | 20 | 20 | 20 |
| Condensate, % Theory | 86 | 84 | 95 | 84 | 78 | 82 | 82 | 82 |
| Product Properties | | | | | | | | |
| Average m. wt. | 1122 | 1156 | 762 | 1417 | 1098 | 1192 | 1326 | 1254 |
| Vis. cp | 27,700 | 29,500 | 271 | 270,000 | 28,000 | 63,500 | 64,700 | 28,600 |
| P, Wt % | 22.2 | 22.7 | 19.7 | 23.3 | 23.1 | — | 23.1 | 23.0 |
| Total Cl, Wt % | 1.29 | 1.57 | 0.50 | 1.91 | 1.25 | — | 1.72 | 1.73 |
| Sol. in $H_2O$ Wt % P | 0.54 | 0.072 | 0.087 | 0.061 | 0.067 | 0.033 | 0.059 | 0.054 |
| | 5% $Na_2CO_3$ | — | — | — | — | 1% HMDA | 95% Linear $PNCl_2$ | 97% $(PNCl_2)_3$ cyclic |

As in Examples X–XI, heating drove off propyl chloride and P–O–P bonds formed.

In the table, the weight percent phosphonitrilic chloride is the weight percent of the phosphonitrilic chloride in the mixture of propoxyphosphazene and phosphonitrilic chloride. In other words, in the table a 12.3 weight percent $PNCl_2$ refers to a reaction mixture having the proportions 12.3 grams of phosphonitrilic chloride and 87.7 grams of propoxyphosphazene.

The temperature of entry "1st liquid drop" refers to the temperature at which propylchloride first begins to distill. The time entry "warming up," refers to the elapsed time between initiating heating from room temperature until the first liquid drop of propyl chloride appears. The reaction time is the time in minutes at which the reaction mixture was maintained at the maximum temperature. The stripping time was the time at which the reaction mixture was maintained at maximum temperature while applying proper vacuum to assist removal of the propyl chloride. In Run No. 1, 5 weight percent sodium carbonate was added to the reaction mixture. Likewise, in Run No. 6, 1 weight percent of hexamethylene diamine was added to the reaction mixture. As can be seen from the results, propyl chloride began to distill at a lower temperature when sodium carbonate was present in the reaction mixture. In contrast to the other items listed in the table, Runs 7 and 8 were conducted on prepared linear and cyclic $PNCl_2$.

In the table, "condensate, % theory" means the percentage of propyl chloride removed as compared to the theoretical amount removable.

Some properties of additional materials made in general accordance with the procedures set forth in Table II are as follows:

TABLE III

| | A | B | C | D |
|---|---|---|---|---|
| P, wt % | 22.2 | 21.7 | 21.0 | 22.3 |
| N, wt % | 10.1 | 10.1 | 9.69 | 10.4 |
| P/N | 2.20 | 2.15 | 2.17 | 2.14 |
| C, wt % | | | | |
| H, wt % | | | | |
| Cl, wt % | 1.27 | 0.82 | 1.60 | 3.89 |
| Hydr. Cl, wt % | | | | 0.13 |
| Na, wt % | | | | |
| MW (in benz.) | 1030 | 1090 | | |
| (in THF) | | 1029 | 905 | |
| Vis, 25° cp | 4047 | 13739 | 1275 | 6400 |
| 20° cs | 4253 | 20939 | | |
| Refr. index, $n_d^{20}$ | 1.4746 | 1.4788 | 1.4674 | |
| Density, 20°, g/ml | 1.1887 | | 1.0911 | |
| Trimer | 13.6 | 2.8 | 15.6 | 9.0 |
| Tetramer | 8.9 | 4.4 | 8.2 | 5.7 |
| Pentamer | 0.8 | trace | 0 | 0.5 |
| Cl trimer | 0 | trace | 0 | 0.6 |

The polymer resulting from the phosphazene and phosphonitrilic halide condensation reaction is then reacted with an aqueous alkali or alkaline earth metal hydroxide. Typical alkali metals are lithium, sodium, potassium, rubidium, and the like. Typical of the alkaline earth metals are calcium, strontium, barium, and the like. Preferred are sodium, potassiuim and calcium with sodium being most highly preferred.

The concentration of alkali metal or alkaline earth metal hydroxide in the aqueous solution is not critical. Solutions may be dilute or concentrated so long as the concentration is sufficient to provide a good rate of reaction with the resultant polymer. Typical concentrations can range from about 5 to 50 weight percent of the alkali or alkaline earth metal hydroxide. For convenience and economy, sodium hydroxide is preferred and illustrative of the other suitable materials. Thus, typical caustic solutions can be employed ranging from about 10 to about 30 weight percent caustic.

An amount of the alkali or alkaline earth metal hydroxide sufficient to react with the resultant polymer should be employed. It should be understood that too much of the hydroxide will obviate the previous phosphazene and phosphonitrilic halide reaction, breaking substantially all of the P—O—P bonds formed. Only amounts of the hydroxide sufficient to react with some of the P—O—P bonds, forming —P—O—Na and —P—O—H bonds should be used. Preferably from about 1 to about 15 weight percent of the aqueous hydroxide solution based on the amount of the resultant polymer can be used. More preferably from about 3 to about 10 weight percent of aqueous hydroxide solution can be used.

The temperature of the aqueous hydroxide treatment of the resultant polymer is not critical. However, sufficient temperature to obtain good reaction rates is desired. Preferably from about ambient temperature to slightly elevated temperatures can be employed. The temperature should not be as high as the phosphazene and phosphonitrilic halide reaction since additional condensation might occur further altering the resultant polymer. Specifically, temperatures from about room temperature, that is, about 20°C to about 100°C are preferred. More preferred are temperatures from about 50° to about 85°C are more preferred.

The reaction occurs readily at these temperatures and is over after a short period. Usually the aqueous hydroxide is added with stirring and the reaction is over in a few minutes. The time will naturally depend on the efficiency of the stirrer and the size of the reaction vessel, but times of up to 10 minutes, 20 minutes, 30 minutes or even up to an hour can be used.

EXAMPLE XIII

To a 500 cc 3-necked glass reaction vessel was added 200 g of a hexapropoxyphosphazene having a viscosity of 77.4 centipoise at 25°C, a number average molecular weight of 695 and the following elemental analysis:

| | |
|---|---|
| P, wt % | 17.81 approx. |
| N, wt % | 9.15 |
| Total Cl, wt % | 0.69 |

Then 24 g of phosphonitrilic chloride was added to the reaction vessel. The reaction mixture was heated to 145°C with stirring and held at temperature for 60 minutes. Propyl chloride was evolved during the heating, condensed and 27.1 g collected. Vacuum of about 10–20 mm Hg was drawn on the reactor for 10 minutes to remove any residual propyl chloride. Then the resultant polymer was cooled to 80°C and 10 g of a 20 percent caustic solution was added to the reaction vessel with continued stirring. The final product had a viscosity of 3,981 cp. at 25°C.

EXAMPLE XIV

The procedure of Example XIII was followed except that 35 g of phosphonitrilic chloride was used. The heating was to 140°C for 1 hour, followed by 10 minutes of vacuum treatment. Again 10 g of 20 weight percent caustic was added at 81°C with continued stirring. The final product is characterized as follows:

| | |
|---|---|
| P, wt % | 22.1 |
| Total Cl, wt % | 2.94 |
| Solubility in $H_2O$, wt % | 0.14 |
| pH | 4 |

EXAMPLE XV

Following the procedure of Example XIII, 200 g of the hexapropoxyphosphazene used in Example XIII and 28 grams of phosphonitrilic chloride are heated to 145°C and held at temperature for 60 minutes. After a 10 minute vacuum treatment at about 10–20 mm Hg, the reactor contents were cooled to 80°C. After caustic treatment as in Example XIII, the final product had the following characteristics:

| | |
|---|---|
| P, wt % | 21.9 |
| Total Cl, wt % | 1.99 |
| $H_2O$ solubility, wt % | 0.21 |
| Viscosity at 25°C | 10,600 cp |
| pH | 5 |

EXAMPLE XVI

To a suitable reaction vessel was added 20 pounds of hexapropoxyphosphazene having the following analysis:

| | |
|---|---|
| P, wt % | 18.5 |
| N, wt % | 8.48 |
| Total Cl, wt % | 0.37 |
| Viscosity at 25°C | 87.7 cp |

Also, 2.74 pounds (1244 g) of phosphonitrilic chloride analyzing as follows:

| | |
|---|---|
| Total cyclics | 69.5 |
| Cyclic distribution by VPC | |
| trimer | 75.4% |
| tetramer | 20.0% |
| pentamer | 4.6% |

The mixture was stirred and heated to 145°C, but the first drop of propyl chloride condensed when the temperature of the reaction mixture was 108°C. The heating was continued for 60 minutes after the first drop of condensate was condensed. Then a vacuum was drawn on the reaction vessel, about 49–29 mm of Hg, and the temperature maintained between 137°–140°C. Heating was discontinued, the vacuum broken and a sample pulled for viscosity measurement. Viscosity was 2,332 cp at 25°C.

Heating was started again under vacuum, about 10–20 mm of Hg, and after the temperature reached 145°C it was maintained for about 30 minutes. Again the reaction mixture was cooled, sampled, and the viscosity measured 7,482 cp at 25°C.

Heating was started a third time under vacuum at 145°C, as before, and continued for 30 minutes after attaining temperature. Viscosity of the polymer was 18,635 cp at 25°C.

To the resultant polymer was added 454 grams of a 20 weight percent NaOH solution at a temperature of 64°C. The resultant polymer was divided into two batches of 3,855 and 3,750 grams and each batch was agitated with 203 and 197 grams of distilled water respectively. The final viscosity of the phosphonitrilate polymer was 9,730 cp at 25°C.

Similar results are obtained using phosphonitrilic chloride made by the processes of Examples I–IV and propoxyphosphazene made therefrom. Similar results are obtained using phosphonitrilic chlorides and propoxyphosphazenes made according to procedures of Examples VI and VII.

Similar results are obtained when the weight percent of phosphonitrilic chloride in the mixture of phosphonitrilic chloride and phosphazene is from 5 to 15 weight percent.

Similar results are obtained when the phosphonitrilic chloride and propoxyphosphazene have molecular weights of from when $n = 3$ to 4000.

Similar results are obtained when the reaction temperature is from 120°–220°C, and phosphonitrilic chloride is reacted with organophosphazenes made by reacting phosphonitrilic chloride with
sodium ethoxide
sodium n-butoxide
sodium ethoxide - sodium n-butoxide
50-50 mixture by weight
sodium phenoxide
sodium heptoxide Similar results are also obtained when the aqueous hydroxide is aqueous potassium hydroxide or calcium hydroxide. The products of this invention can be used as fire retardants for cellulose materials, including fibers, filaments, and fabrics.

These materials may be applied to the cellulose by dipping, spraying, or other means utilized for treating the surface. Alternatively, for rayon and other regenerated cellulosics, one or more of the materials may be impregnated or added to the product by incorporation in the viscose prior to spinning. The amount of phosphonitrilic polymer flame retardant dispersed in the regenerated cellulose will vary from about 1 to about 30 weight percent and preferably from about 2 to about 20 weight percent based on the weight of the filament.

For impregnation prior to spinning and the finished materials, one may proceed according to the teachings of Godfrey U.S. Pat. No. 3,455,713. That patent is incorporated by reference herein as if fully set forth. Accordingly, one method of preparing cellulose filaments and filamentary articles according to this invention is to use the flame retardants provided herein according to the method set forth in Godfrey supra. Likewise, the instant invention provides regenerated cellulose filaments and filamentary articles prepared from the flame retardants, herein provided as incorporated utilizing the techniques set forth by Godfrey.

This invention can be extended to preparation and use of materials made by the above procedures where the alkanols or polyols are substituted by halogen, e.g. chlorine and bromine. Suitable monohydric alcohols for this embodiment are made from epichloro- or epibromohydrin. Likewise, 2,3-dichloropropanol, and 2,3-dibromopropanol are suitable. Preferred modified phosphazenes of this invention, as described above, have a number average molecular weight of from about 900 to about 15,000.

What is claimed is:

1. A process for producing a fire retardant phosphonitrilate polymer comprising the steps of (a) heating an organophosphazene of general formula

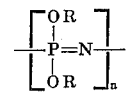

wherein R is an organic radical of 1 to 8 carbon atoms and $n$ is an integer of at least 3 to about 35 where R has 8 carbon atoms up to about 90 where R has 1 carbon atom with from about 1 to about 50 weight percent of a phosphonitrilic halide of general formula $$(PNX_2)_n$$

wherein X is a halogen and $n$ is an integer of at least 3 to about 90 to drive off an organic halide, and (b) reacting the resultant polymer with from about 1 to about 15 weight percent based on the weight of said resultant polymer of aqueous solution containing from about 5 to about 50 weight percent of alkali or alkaline earth metal hydroxide.

2. The process of claim 1 wherein said phosphonitrilic halide is a phosphonitrilic chloride.

3. The process of claim 1 wherein said alkali metal hydroxide is sodium hydroxide.

4. The process of claim 1 wherein said organophosphazene is selected from alkoxy and phenoxy phosphazenes.

5. The process of claim 4 wherein said organophosphazene is an alkoxy phosphazene.

6. The process of claim 5 wherein said alkoxy phosphazene is hexapropoxyphosphazene.

7. The process of claim 4 wherein said organophosphazene is a phenoxy phosphazene.

8. A method of preparing flame retardant regenerated cellulose filament comprising mixing viscose and a flame retardant amount of the phosphonitrilate polymer produced according to the process of claim 1, shaping the mixture into a filament, and coagulating and regenerating the cellulose filament.

9. Regenerated cellulose filaments and filamentary articles having dispersed therein a flame retardant amount of a phosphonitrilate polymer of claim 1.

* * * * *